UNITED STATES PATENT OFFICE.

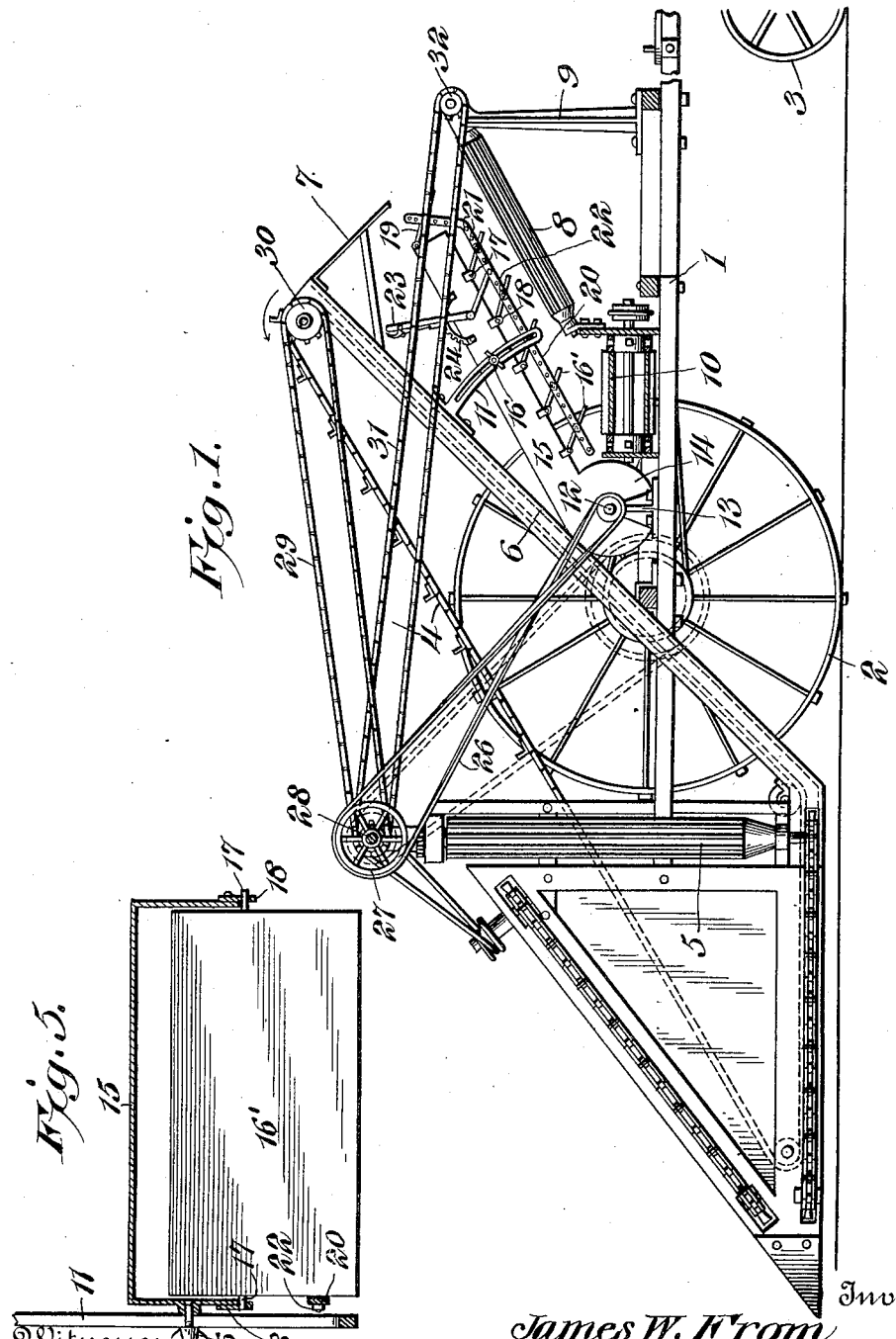

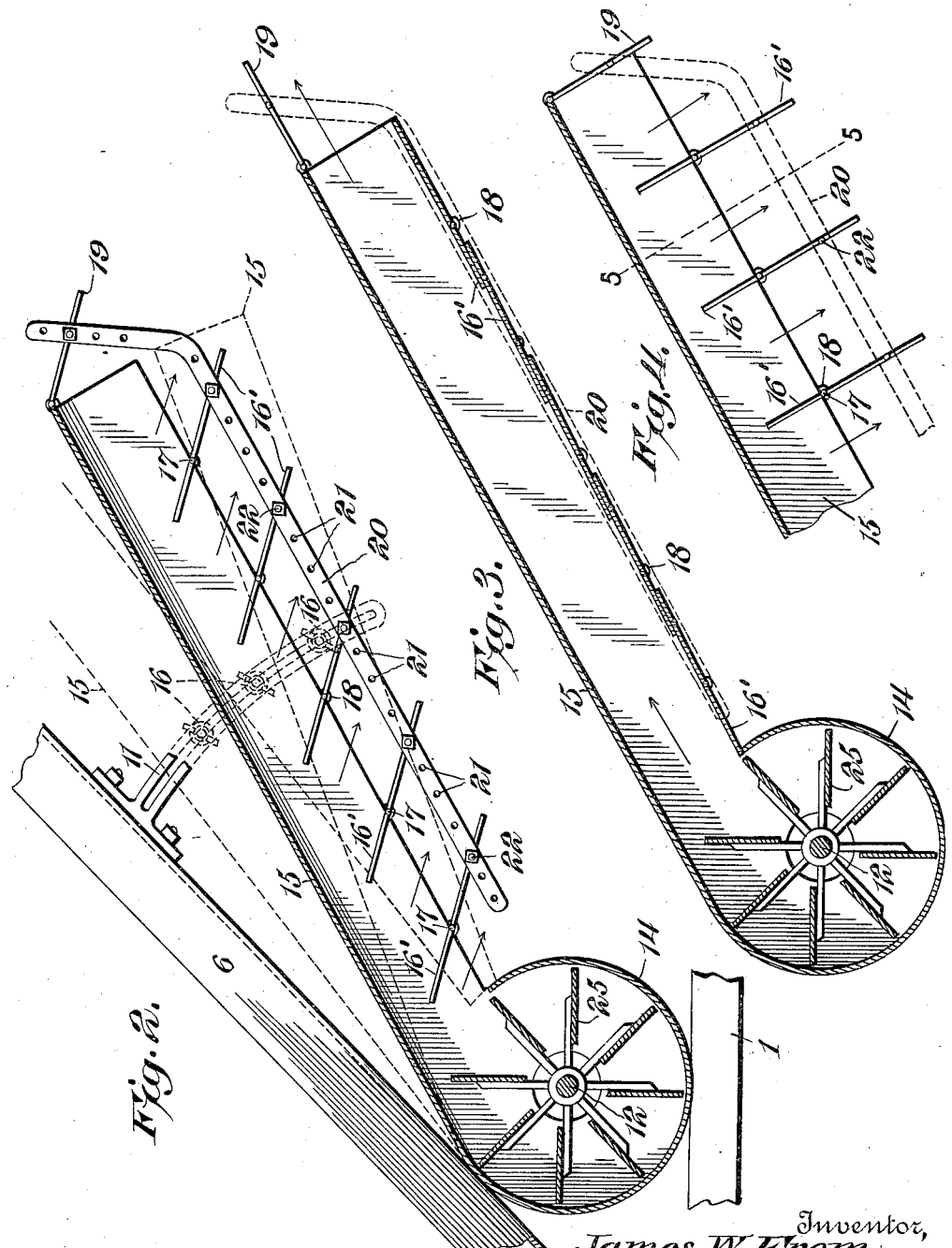

JAMES W. FROM, OF SHELBY, NEBRASKA.

CORN-HUSKING MACHINE.

1,092,349. Specification of Letters Patent. Patented Apr. 7, 1914.

Application filed April 21, 1910. Serial No. 556,757.

*To all whom it may concern:*

Be it known that I, JAMES W. FROM, a citizen of the United States, residing at Shelby, in the county of Polk and State of Nebraska, have invented a new and useful Corn-Husking Machine, of which the following is a specification.

This invention relates to improvements in corn husking machines, and the object of the invention is to provide means whereby the loose husks and small particles which may adhere to the ears of corn after they are stripped from the stalks will be removed before the ears fall on to the rollers by which they are delivered to the discharge conveyer.

My present improvements are applicable to any form of corn husker but are intended more especially for use in connection with the corn husker disclosed in Letters Patent No. 942,820, granted to me December 7, 1909, in which the corn husking machine is designed to strip the ears from the standing corn in the field and consequently the subsequent operations of removing any loose husks and such materials which may adhere to the ears of corn and which may include weeds and particles of dirt, are subject to various conditions, such as the moist or dry condition of the corn husks and the thoroughness with which the machine will strip the ears from the stalks without admixture of husks.

My present improvements are fully illustrated in the accompanying drawings, and the invention consists in certain novel features of the same which will be hereinafter first fully described and then more particularly pointed out in the appended claims.

In the drawings, Figure 1 is a sectional elevation of my improved device showing it in position upon a husking machine of the type shown in my before-mentioned patent. Fig. 2 is a longitudinal section of the improvement removed from the husking machine and shown on a larger scale. Fig. 3 is a similar view showing a different position of the parts. Fig. 4 is an enlarged longitudinal section of a portion of the device showing a third position of the same. Fig. 5 is a transverse section on the line 5—5 of Fig. 4.

The corn-husking machine embodies a frame 1 mounted upon traction wheels 2, of which only one is shown and a steering or caster wheel 3 and also a conveyer belt 4 adapted to feed the ears of corn from stripping rollers 5 up an inclined chute 6 in the manner fully described in my said Letters Patent. At the upper end of the chute 6, there is secured a guide plate 7 over which the ears of corn may descend and drop onto husking rollers 8 supported on a standard 9 erected on the frame 1 and arranged at an inclination to the said standard so that their front ends will be approximately over an endless conveyer 10 by which the ears of corn are carried to one side of the machine and delivered to a wagon or other receptacle to be removed from the field. Below the upper end of the chute 6 there is secured to the under side of the same a bracket or slotted arm 11 which is curved on an arc having the blower shaft 12 as a center, and the said shaft is journaled in a suitable bracket 13 erected on the main frame 1 of the machine, as shown. A fan or blower casing 14 is fitted around the blower shaft 12 and has an elongated tubular arm or body 15 extending upward and rearward therefrom, the said arm being adjustably secured to the bracket 11 by a thumb screw 16, as shown and as will be readily understood. The bottom of this tubular arm is composed of a series of blades or slats 16' which are provided at their ends with suitable pivot pins 17 mounted in bearings 18 on the sides of the arm 15, whereby the said slats may be folded together as shown in Fig. 3 or may be arranged at different angles so as to open the bottom of the tubular arm to a greater or less degree, as will be readily understood on reference to Figs. 2 and 4. At the end of the tubular arm 15, I provide a door 19 which is hinged at its upper end to the upper edge of the arm and is adapted to fold against the end of the arm, as shown in Fig. 4, whereby to entirely cut off the flow therefrom. The several slats and the said door 19 are connected by a metallic strap or connecting bar 20 which is provided with a series of openings 21 adapted to be engaged by bolts 22 on the several slats near their outer edges so that the slats may be connected or disconnected at will and consequently some of the slats rendered inoperative if so desired. In order that the several slats in the door may be simultaneously adjusted with convenience, an operating lever 23 is fulcrumed on the side of the blower arm 15 and is connected at its lower end to the strap or connecting bar 20 so that when the lever is vibrated, the said connecting bar or strap will be moved longitudinally and the slats and end door 19 simultaneously adjusted. In order to hold the lever in any position to which it may be adjusted, a quadrant 24 is secured on the arm and adapted to be engaged by the usual latch on the lever, as will be readily understood. A fan or blower 25 is secured to the shaft 12 within the fan or blower casing 14 and the said blower shaft is connected by a crossed belt 26 with a pulley 27 secured on a shaft 28 which actuates the gearing whereby the husking rollers 5 are operated, and this shaft receives motion from the traction wheels 2 through suitable gearing indicated in dotted lines in Fig. 1. The conveyer 4 is operated from this shaft 28 through a sprocket chain 29 and a sprocket wheel 30 at the upper turn of the conveyer, and the rollers 8 are likewise operated from the said shaft 28 through a sprocket chain 31 and a sprocket 32 at the end of the countershaft which is geared to the several rollers 8, as will be readily understood.

It will be understood, on reference to Fig. 1 of the drawing, that the blower is disposed under the chute 6 and over the rollers 8 and conveyer 10 so that a blast of air sent through the casing of the blower will be directed toward the rollers 8 and thereby act on the ears of corn dropping upon the same so as to blow from the said ears any particles of the husks which may have remained thereon. These particles of husks and other foreign matter will be blown over the upper ends of the rollers 8 and discharged in rear of the machine, as will be readily understood. The blower casing can be readily adjusted by means of the bracket 11 and the set screw 16 to any desired angle and, consequently, may be readily applied to any husking machine. The slats 16' may be set at any desired angle with respect to the body of the blower casing so that the air will be intercepted and deflected upon the rollers more or less directly and consequently adjusted to the work to be done. It may sometimes be sufficient to direct the air blast upon the ears of corn as they fall from the chute 6 to the rollers 8, and when this is the case, the connecting rod 20 will be swung upward and rearward so as to fold the slats 16' together, as indicated in Fig. 3, and open the door 19 to its full extent, whereupon the blast of air will emerge through the end of the blower casing, as indicated by the arrows. If the ears of corn are comparatively clean, the blast of air emerging from the end of the blower casing will thoroughly drive off all light particles of husks which have not been previously removed. Should it be desired to direct some of the air toward the rollers through the bottom of the blower casing without at the same time exposing the full length of the rollers to the action of the blast, some of the slats may be disconnected from the rod 20 so that the operation of the said rod will not affect the same and, consequently, some of them will remain open while others will stay closed and portions of the rollers will not be subjected to the action of the blast. Should there be portions of the husks remaining on the ears of corn which cannot be blown therefrom, the air blast will hold the said husks to the rollers 8 so that the said rollers may readily grip the same and the operation of the rollers will be made easier and more certain than would be otherwise possible.

Since the corn husking machine illustrated in the aforesaid Letters Patent and to which the present invention is particularly applicable is designed to operate in the field and upon standing corn stalks, the prevalent weather conditions will have a very material effect upon the operation of the machine, wherefore it becomes necessary to provide a blast which will not only force any husks that may remain on the ears into engagement with the husking rollers so that such adherent husks are pulled from the ears, but will blow any loose trash, such as loose husk leaves or weeds or anything that may be in with the corn, away from the corn before it reaches the husking rollers. If the corn be damp, a stronger blast is necessary to blow off the loose trash and, furthermore, if there is much trash it cannot all go through the rollers, and some will pass on with the ears to the conveyer to be driven therefrom by the air blast directed against the conveyer. Again, it requires at times more blast to force ears down on the rollers to cause the husks which may be present to be caught and pulled off by the rollers. It is for these reasons and to meet the varying conditions of removing the ears from the stalks in the field and delivering them in a clean condition to a suitable receptacle traveling along with the machine that the adjustable blower is provided, whereby it is within the power of the operator to adjust the blast to the conditions found to be present in any particular field or on any particular day, whereby the corn may be delivered in a markedly clean condition to the receptacle therefor.

The ears of corn carried up the chute 6 by the conveyer 4 are discharged from the upper end of the said conveyer and dropped to the rollers 8, down which they pass to the endless conveyer 10, and by the said conveyer they are carried laterally from the machine and deposited in a wagon or other receptacle, as before stated, and as fully set forth in my aforesaid Letters Patent.

The advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. A corn husking machine provided with inclined husking rollers, a conveyer at the lower end thereof, and longitudinally extending means disposed at that side of the conveyer remote from the husking rollers and arranged in overlying relation to the rollers and conveyer for producing a series of air streams against the rollers lengthwise thereof and also against the conveyer.

2. A corn husking machine provided with inclined husking rollers, a conveyer at the lower end thereof, and longitudinally extending means disposed at that side of the conveyer remote from the husking rollers and arranged in overlying relation to the rollers and conveyer for producing a series of air streams against the rollers lengthwise thereof and also against the conveyer, said means being provided with devices for varying the direction of the air streams to include either the rollers and conveyer or the rollers alone.

3. A corn husking machine provided with inclined husking rollers, a conveyer at the lower end thereof, and longitudinally extending means disposed at that side of the conveyer remote from the husking rollers and arranged in overlying relation to the rollers and conveyer for producing a series of air streams against the rollers lengthwise thereof and also against the conveyer, said means being provided with devices for varying the direction of the air streams to include either the rollers and conveyer or the rollers alone, said means being further provided with mechanism for adjusting the same toward or from the rollers to diminish or increase the space separating said means from said rollers.

4. A corn husking machine provided with inclined husking rollers and a blower located beyond the lower ends of the rollers and provided with a casing having a tubular arm or body extending in overlying spaced relation to the rollers lengthwise thereof, said body being provided with an open bottom and an open upper end directed toward the receiving end of the rollers, and means for controlling the open bottom and upper end to direct streams of air through either or both.

5. A corn husking machine provided with husking rollers and a blower located beyond one end of the rollers and provided with longitudinally extended means overlying the rollers for directing a series of streams of air against the rollers, and means for adjusting the air stream producing means bodily toward and from the rollers to diminish or increase the space separating said air stream producing means from said rollers.

6. A corn husking machine provided with inclined husking rollers, a conveyer in elevated spaced relation to the upper ends of the rollers for feeding corn thereto through an air space on to the rollers, another conveyer at the lower ends of the rollers for receiving corn therefrom, and a blower located at that side of the lower conveyer remote from the rollers and provided with an elongated arm or body in longitudinal overlying relation to and open toward the rollers and the lower conveyer and also open at the upper end toward the space between the feeding conveyer and the receiving ends of the rollers, means on the arm or body for controlling and directing air passing therefrom toward the rollers and lower conveyer, and means on the body for directing and controlling air passing through the open end of the body.

In testimony, that I claim the foregoing as my own, I have hereto affixed my signature in the presence of two witnesses.

JAMES W. FROM.

Witnesses:
GEO. W. HEGARTY,
D. C. COLE.

---

Copies of this patent may be obtained for five cents each, by addressing the "Commissioner of Patents, Washington, D. C."